Figure 1:
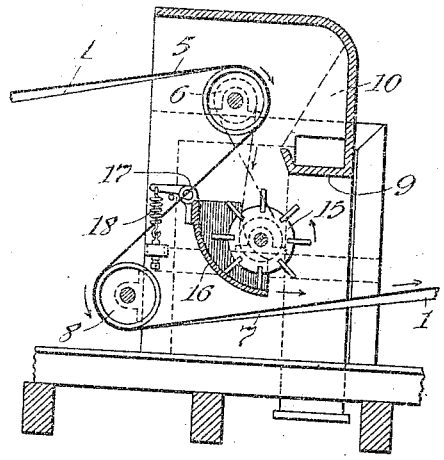

T. A. EDISON.
CONVEYER.
APPLICATION FILED NOV. 22, 1907.

1,041,756.

Patented Oct. 22, 1912.

Witnesses:
Frank D. Lewis
H. H. Dyke

Inventor:
Thomas A. Edison
by Frank L. Dyer
Atty.

UNITED STATES PATENT OFFICE.

THOMAS A. EDISON, OF LLEWELLYN PARK, ORANGE, NEW JERSEY.

CONVEYER.

1,041,756.  Specification of Letters Patent.  Patented Oct. 22, 1912.

Application filed November 22, 1907. Serial No. 403,300.

*To all whom it may concern:*

Be it known that I, THOMAS ALVA EDISON, a citizen of the United States, and a resident of Llewellyn Park, Orange, county of Essex, and State of New Jersey, have invented certain new and useful Improvements in Conveyers, of which the following is a description.

My invention relates to apparatus for placing material on traveling conveyers. Where material to be conveyed is dropped upon a conveyer, a considerable amount of wear results, due to the friction developed between the material and the conveyer while the material is being brought up to the speed of the latter, and also, due to the impact of the material being dropped upon the conveyer from above.

In my Patent No. 861,819, granted July 30, 1907, I have shown a device which obviates the first named difficulty by throwing the material forward so that when it drops upon the conveyer it has the same speed as the latter, and the wear due to the bringing up of the material to the speed of the conveyer is thereby prevented. Still, by the device of the patent there remains some wear on the conveyer due to the dropping of the material from above upon the conveyer.

The object of the present invention is to do away with the wear due to this cause.

My invention is illustrated in connection with belt conveyers which are passed over supporting rollers so disposed as to form the belt in an S or Z-shape, whereby material may be discharged from the upper run of the belt through conveying chutes or may be discharged on to the lower run of the belt so as to be carried to the next station, but it is to be understood that the invention is capable of use wherever material is discharged from one conveyer to a conveyer at a different level, or where material is placed on a conveyer from a position of rest.

Reference is hereby made to the accompanying drawing, forming a part of this specification, and in which the same reference numerals are applied uniformly to the same parts and wherein—

Figure 2:
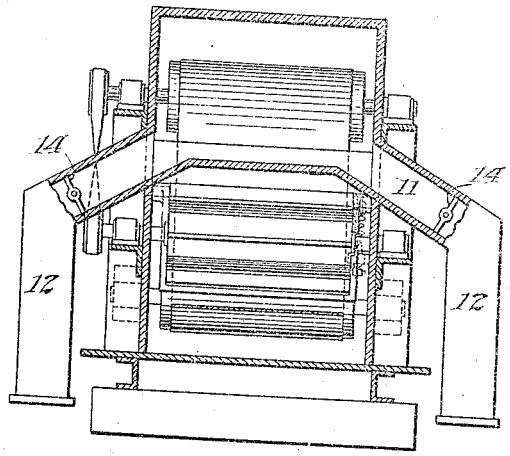
Figure 3:
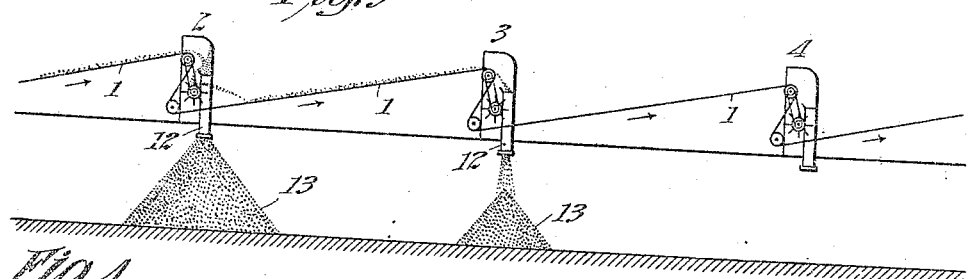
Figure 4:
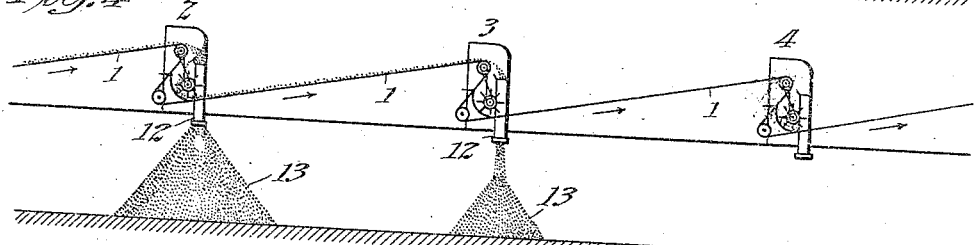

Figure 1, is a longitudinal sectional view of an apparatus embodying my invention; Fig. 2 is a similar view taken at right angles to Fig. 1; Fig. 3 a diagrammatic view showing the operation of the device disclosed in my former patent above referred to, and Fig. 4 is a similar diagrammatic view showing the operation of the improved device which forms the subject matter of this application.

1 represents a suitable conveying belt which is shown in connection with three discharge stations, 2, 3, and 4. I refer to the run 5 of the belt entering the discharge station and passing over the upper pulley 6 as the upper run of the belt, and the run 7 passing off the pulley 8 and leaving the same discharge station, as the lower run of the belt. This arrangement is the same for each station. Any suitable, well-known arrangement may be made use of to give the belt a trough-shape, so as to facilitate the handling of the material. At each station, I provide a shelf 9, on which the material may be accumulated in a pile 10 (see dotted lines—Fig. 1), and extending out over each side of the shelf are chutes 11, having vertical legs 12, which discharge into a suitable stock house. From each of these legs the material will be formed into a pile 13, which when it becomes high enough will close the mouth of the legs 12, and fill up the legs and chutes 11, so as to thereafter overflow on the shelf 9 and fall upon the lower run of the belt to be conveyed to the next station. If, however, it is desired to provide means at each station for cutting off the discharge of the material through it, each chute 11 may be provided with a suitable valve 14, (see Fig. 2) which may be closed when it is desired to prevent the discharge of the material through the chute. In the device of my former patent the material is prevented from flowing directly on to the lower run of the belt, but falls upon a rotating roller or paddle wheel, by means of which it is projected forward so that when it drops upon the belt it has substantially the same speed as the latter, and no wear is caused by bringing the material up to the speed of the belt. The material, however, in the device of the said patent, drops upon the belt from above, as is shown in the diagrammatic view in Fig. 3, and there is still some wear due to the dropping of this material upon the belt.

In the device of the present application, I make use of the same roller or paddle wheel, but I rotate this paddle wheel 15 in the direction shown by the arrows, which is the opposite direction from that in which it was formerly rotated, and I provide a trough-shaped guard 16, made preferably of chilled iron, which is pivoted at 17 and held close to the paddle wheel 15 by means of a spring 18. The lower edge of this guard is very close to the conveyer belt and when the material is dropped upon the paddle wheel from above and thrown forward from below, between the wheel and the guard, it passes directly on to the belt at the same level therewith, and with substantially the same speed as the belt, so that there is practically no wear whatever on the belt, due to the placing of the material thereon. The guard 16 obviously determines the quantity of material projected upon the belt by the wheel 15, since the thickness of the stream of material will be limited to the space between the guard and the body part of said wheel. If, however, any large object (such as frequently finds its way by accident into the material) should enter the space between the guard and wheel, the former will yield against the tension of the spring 18, so as to prevent injury or breakage.

Having now described my invention, what I claim is:

1. In a device of the class described, the combination with the upper and lower runs of a belt, of means for receiving material discharged from the upper run of the belt and discharging it forwardly upon the lower run of the belt in the direction of the travel of the latter at substantially the same speed as that of the belt and from a point at substantially the same elevation as the lower run of the belt, substantially as set forth.

2. In a device of the class described, the combination with the upper and lower runs of a belt, of a stationary shelf for receiving the material discharged from the upper run and means located beneath the shelf for receiving material discharged therefrom and projecting it forwardly in the direction of and from a point at substantially the same elevation as the lower run, substantially as set forth.

3. In a device of the class described, the combination with the upper and lower runs of a belt, of a roller located between the upper and lower runs for receiving material discharged from the upper run and projecting it forwardly in the direction of the lower run, a pivoted trough-shaped guard for said roller, and a spring for holding said guard close to the roller, substantially as set forth.

4. In a device of the class described, the combination of a conveyer, a rotating paddle wheel above the conveyer, a pivoted guard normally maintained in proximity to the paddle wheel, but movable away from the same, and a spring for opposing such movement, substantially as set forth.

5. In a device of the class described, the combination with the upper and lower runs of a belt, of rotary means for receiving material discharged from the upper run of the belt, and acting on the material to discharge it forwardly upon the lower run of the belt in the direction of the travel of the latter and from a point at substantially the same elevation as the lower run of the belt, substantially as described.

6. The combination of a traveling imperforate belt conveyer adapted to carry a continuous stream of closely associated solid particles of material, a rotary drum or roller mounted adjacent the same, its lower surface moving in the same direction as said conveyer, means for feeding to said roller a continuous stream of closely associated solid particles of the width to be carried by the conveyer, said roller having peripheral means adapted to cause the velocity of the roller to be imparted to said particles of material, and the same to be projected upon the conveyer in a continuous stream, and means for rotating the roller with a surface speed substantially equal to that of the conveyer, the arrangement of the roller with respect to the conveyer being such that the solid particles meet the surface of the conveyer without any substantial drop, whereby wear upon the conveyer due to the discharge thereon of said particles is minimized, substantially as set forth.

7. The combination of a traveling imperforate belt conveyer adapted to carry a continuous stream of closely associated solid particles of material, a rotary drum or roller mounted adjacent the same, its lower surface moving in the same direction as said conveyer, means for feeding to said roller a continuous stream of closely associated solid particles of the width to be carried by the conveyer, said roller having peripheral means adapted to cause the velocity of the roller to be imparted to said material, and the same to be projected upon the conveyer, a guard below said roller for supporting said solid particles, and means for rotating the roller with a surface speed substantially equal to that of the conveyer, the arrangement of the roller with respect to the conveyer being such that the solid particles meet the surface of the conveyer without any substantial drop, whereby wear upon the conveyer due to the discharge thereon of said particles is minimized, substantially as set forth.

This specification signed and witnessed this 19th day of November 1907.

THOMAS A. EDISON.

Witnesses:
FRANK L. DYER,
ANNA R. KLEHM.